Patented June 14, 1932

1,862,596

UNITED STATES PATENT OFFICE

KARL KELLER AND FERDINAND MÜNZ, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

POLYHALOGENATED FATTY ACIDS AND PROCESS OF MAKING SAME

No Drawing. Application filed July 10, 1929, Serial No. 377,348, and in Germany July 25, 1928.

Our invention relates to new polyhalogenated fatty acids of the general formula:

$$C_nH_{2n+1-x-m}R_mHal_x-COOH$$

wherein R means hydrogen or hydroxyl, $m$ the number 1 or 2, $n$ a number more than 8 and $x$ a number more than 2. They are obtained by acting on fatty acids containing more than eight carbon atoms with such an amount of a halogen (chlorine or bromine) or of a halogenating agent, that at least trihalogenated derivatives are obtained, and at least one hydrogen atom of the carbon chains is replaced by halogen. Under this term we include saturated as well as unsaturated fatty or hydroxyfatty acids.

The process of halogenation is advantageously carried out in the presence of an organic diluent. When using saturated fatty acids as starting materials, three or more hydrogen atoms are replaced by halogen; when starting from unsaturated fatty acids, two halogen atoms are taken up by the double bond and at least one hydrogen atom is replaced by halogen. In the case of hydroxyfatty acids apparently the hydroxygroup and in all cases the carboxygroup remains unattacked.

The new polyhalogenated fatty acids are viscous oils to plastic materials, mostly almost colorless and sticky. They are soluble in dilute caustic alkali solutions. They may be used as intermediates for the production of valuable compounds useful for various technical purposes, particularly as dyeing expedients.

In order to further illustrate our invention the following examples are given, the parts being by weight and all temperatures in centigrade degrees; but we wish it to be understood that our invention is not limited to the examples given, nor to the exact conditions stated therein.

Example 1

Into 100 parts of ricinoleic acid at about 40–50° a current of chlorine is introduced, while well stirring until an increase of weight of 36 parts is obtained. The chlorine is taken up with a strong evolution of hydrochloric acid. The reaction product is an almost colorless viscous and sticky oil. According to the quantity of chlorine absorbed it contains 3 atoms of chlorine in the ricinoleic acid molecule and corresponds probably to the formula:

$$C_{17}H_{31}(OH)Cl_3COOH.$$

Advantageously it may be freed in the usual manner from some quantities of hydrochloric acid dissolved therein. It may be used for various reactions of decomposition.

Example 2

Into 100 parts of ricinoleic acid at about 40–80°, while stirring, chlorine is introduced until an increase of weight of 72 parts is obtained. The reaction product is warmed some time in vacuo at about 50° in order to remove some hydrochloric acid dissolved therein. It represents a colorless sticky substance being tough at ordinary temperature. Apparently the molecule contains 6 chlorine atoms and the new compound corresponds probably to the formula:

$$C_{17}H_{28}(OH)Cl_6COOH.$$

It is soluble in dilute caustic alkali solutions and may be used for various reactions of decomposition.

Example 3

100 parts of ricinoleic acid are dissolved in about 200 parts of carbon tetrachloride. At about 30–40°, while well stirring and cooling, chlorine is introduced into this solution, until 185 parts are absorbed with a strong evolution of hydrochloric acid. Then the carbon tetrachloride is distilled off in vacuo. The reaction product represents a brownish substance of colophony-like properties, being at ordinary temperature brittle and lustrous and a plastic material at more elevated temperatures. It is soluble in dilute caustic alkali solutions. Apparently the ricinoleic acid molecule contains 16 atoms of chlorine and the new product corresponds probably to the formula:

$$C_{17}H_{18}(OH)Cl_{16}COOH.$$

Example 4

50 parts of ricinoleic acid are dissolved in about 100 parts of carbon tetrachloride in an apparatus provided with a reflux condenser and at about 70–80° chlorine is introduced while well stirring, until an increase of weight of 49 parts is obtained. Then the carbon tetrachloride is removed by distillation in vacuo and the reaction product remains as a compact mass. The ricinoleic acid molecule apparently has taken up 7 atoms of chlorine and the new compound corresponds probably to the formula:

$$C_{17}H_{27}(OH)Cl_7COOH$$

Example 5

A current of chlorine is introduced at about 30–40° into 100 parts of oleic acid until an absorption of 36 parts is obtained. Apparently the oleic acid molecule has taken up 3 atoms of chlorine and the reaction product corresponds probably to the formula:

$$C_{17}H_{32}Cl_3COOH.$$

It represents a thin oil and may be used likewise for various reactions of decomposition.

Example 6

50 parts of oleic acid are dissolved in about 100 parts of carbon tetrachloride in an apparatus provided with a reflux condenser and, while well stirring at about 40–50°, chlorine is introduced until an increase of weight of 25 parts is obtained. The carbon tetrachloride is distilled off in vacuo. The remaining reaction product is a thin oil, corresponding probably to the formula of a tetrachloro oleic acid $$C_{17}H_{31}Cl_4COOH.$$

Example 7

30 parts of stearic acid are dissolved in about 100 parts of carbon tetrachloride. While stirring at about 70–85°, chlorine is introduced until an increase of weight of 22 parts is obtained. Then the carbon tetrachloride is distilled off in vacuo. The remaining new compound contains 6 chlorine atoms in the stearic acid molecule and corresponds probably to the formula:

$$C_{17}H_{29}Cl_6COOH.$$

It represents a viscous sticky oil. It is likewise suitable as starting material for the production of valuable compounds. In the same manner five and seven chlorine atoms may be introduced in the stearic acid molecule. The penta- and heptachloro-derivatives show similar properties as the hexachloro-product.

Example 8

81 parts of bromine are slowly introduced into 50 parts of ricinoleic acid. While the mass becomes warm the bromine is taken up. The absorption is finished by heating the mass for some time to about 70–80°. In this manner 52 parts of bromine are absorbed. The remaining reaction product is a light brown oil. It contains apparently 4 bromine atoms in the ricinoleic acid molecule and corresponds probably to the formula:

$$C_{17}H_{30}(OH)Br_4COOH.$$

Also this product may be used for various reactions of decomposition.

Example 9

Into 32 parts of dihydroxystearic acid prepared in the usual manner, while stirring at about 75–85°, dry chlorine gas is introduced until an increase of weight of 18 parts is obtained. The reaction product is worked up as described in the foregoing examples. It represents an almost colorless oil and corresponds probably to the formula:

$$C_{17}H_{28}(OH)_2Cl_5COOH.$$

It may be likewise used for various reactions of decomposition.

We claim:

1. A process which comprises acting with such an amount of a halogen, that at least trihalogenated derivatives are obtained and at least one hydrogen atom of the carbon chains is replaced by halogen, on fatty acids containing more than eight carbon atoms.

2. A process which comprises acting with such an amount of a halogen, that at least trihalogenated derivatives are obtained and at least one hydrogen atom of the carbon chains is replaced by halogen, on fatty acids containing eighteen carbon atoms.

3. A process which comprises acting with such an amount of a halogen, that at least trihalogenated derivatives are obtained and at least one hydrogen atom of the carbon chains is replaced by halogen on ricinoleic acid.

4. As new compounds polyhalogenated hydroxystearic acid derivatives of the probable general formula:

$$C_{17}H_{35-x-m}(OH)_mHal_xCOOH,$$

wherein $m$ means the number 1 or 2, $x$ a number more than 4, which compounds are viscous oils to plastic materials, soluble in dilute caustic alkali solutions, mostly almost colorless and sticky.

5. As a new compound a hexachloro-hydroxystearic acid of the probable formula:

$$C_{17}H_{28}(OH)Cl_6COOH,$$

which compound represents a colorless sticky substance, soluble in dilute caustic alkali solutions, being tough at ordinary temperature.

In testimony whereof we affix our signatures.

KARL KELLER.
FERDINAND MÜNZ.